United States Patent [19]

Bivens, III et al.

[11] Patent Number: 5,472,156
[45] Date of Patent: Dec. 5, 1995

[54] AIR COMBAT COLLECTIVE CONTROL HEAD

[75] Inventors: Courtland C. Bivens, III, Great Mills, Md.; Edward Rogers, Saratoga, Calif.

[73] Assignee: The United States of America as represented by the Secretary of the Army, Washington, D.C.

[21] Appl. No.: 218,926

[22] Filed: Mar. 28, 1994

[51] Int. Cl.⁶ .................................................. B64C 13/04
[52] U.S. Cl. ........................... 244/234; 244/229; 74/523
[58] Field of Search ........................... 244/220, 221, 244/229, 234; 74/523

[56] References Cited

U.S. PATENT DOCUMENTS

| | | | |
|---|---|---|---|
| D. 135,167 | 3/1943 | Obszarny et al. | 244/234 X |
| 3,219,296 | 11/1965 | Rasmussen | 244/234 |
| 3,726,497 | 4/1973 | Gannett et al. | 244/234 |
| 4,012,014 | 3/1977 | Marshall. | |
| 4,062,508 | 12/1977 | Stephens et al. | 244/234 |
| 4,114,843 | 9/1978 | Robinson | 244/234 X |
| 4,420,808 | 12/1983 | Diamond et al.. | |
| 4,574,651 | 3/1986 | Nordstrom. | |
| 4,763,860 | 8/1988 | Vauvelle et al.. | |
| 4,811,921 | 3/1989 | Whitaker et al. | 244/234 |
| 4,865,277 | 9/1989 | Smith et al. | 244/234 |
| 5,149,023 | 9/1992 | Sakurai et al. | 244/234 X |
| 5,156,363 | 10/1992 | Cizewski et al. | 244/234 X |

FOREIGN PATENT DOCUMENTS

| | | | |
|---|---|---|---|
| 4204223 | 8/1993 | Germany | 74/523 |
| 995560 | 6/1965 | United Kingdom | 244/234 |

*Primary Examiner*—William Grant
*Attorney, Agent, or Firm*—John H. Lamming; Arthur H. Tischer; Anthony T. Lane

[57] ABSTRACT

An air combat control head with an extension provides a head for a collective control stick wherein system control switches may be located for easy access by the operator and an extension comprising a phenolic coated hand grip and a bottom tube component. The hand grip is offset laterally and longitudinally from the bottom tube component, and the head is canted back toward the operator, making the system control switches workable by the operator's thumb while the rest of the operator's hand grips the stick and maintains control of the collective pitch of the main rotor blades. The collective control head of the invention provides a controller that is comfortable for an operator to use, even in extended flight operations, and that reduces fatigue, discomfort and distraction while making system control operations easy and effective.

21 Claims, 4 Drawing Sheets

AIR COMBAT COLLECTIVE CONTROL HEAD

BACKGROUND OF THE INVENTION

This invention pertains to a collective control stick air combat switch control head and extension for use on rotorcraft, primarily. The collective control head and extension (hereinafter "control head" or simply "head") are shaped and conformed to account for anthropomorphic factors of hand size; hand, forearm and torso orientation with the operator seated; body orientation with the operator manipulating the control stick; accessibility of system control switches; and the operator's ease of control stick and system switch operations while piloting the aircraft. The control head sits atop a control stick and contains one or more buttons or switches for operating auxiliary systems of an aircraft such as a helicopter. The general purpose of a control head is to put system control means in proximity to an operator's (pilot's or copilot's) hand. It is important to design the control head so as to make the switching operations relatively swift, sure and convenient for the operator while he is piloting the aircraft. It is also important that a control head be designed, wherever possible, to relieve fatigue and mitigate distractions that an operator may experience in performing multiple control functions during extended flight operations. The particular switches placed on a control head will vary in number and kind depending on the primary mission assigned to the aircraft they are installed on.

In recent years, there have been many developments and refinements in auxiliary systems that support a wide variety of aircraft missions. These systems relate to utility, reconnaissance, transport, heavy lift, and weapons and combat applications. The placement of these multifarious systems on modern aircraft has required the concomitant placement of control switches and buttons in the cockpit to enable the aircraft operators to activate and use the systems. It is often desirable to place the auxiliary system control means on control heads. The resulting addition of control heads has necessarily raised ergonomic questions about the design and placement of the new control heads, and possible modifications in stick design.

At the same time, in the related art, the military and commercial aircraft designers and manufacturers (the latter often jointly with the military) have experimented with new designs for aircraft control sticks, particularly with helicopter control sticks. Such new designs were prompted in part by developments in fiber optic communications and advanced electronics, which introduced the possibility of transmitting flight control inputs from the cockpit to the main rotor and the tail rotor by electronic rather than mechanical or servo-mechanical means. In testing the practicality of using fiber optic technology in this manner, multi-axis (2-axis, 3-axis, and 4-axis) controllers have been built and tested as prototypes or as concept models. Multi-axis controllers usually comprise a hand grip on an arm rest; the hand grip controller may have system control switches in its head or upper portion.

Control sticks currently installed on most of the world's helicopters remain quite standard in design and placement in the cockpit. A helicopter pilot's collective control stick of the prior art is shown in FIG. 1. This stick is essentially the same as older collective sticks, except that it has a head containing some system control switches. The straight shaft of the stick is the same basic design for all collective sticks, whether or not they are fitted with control heads.

As depicted in FIG. 1, it is possible to substitute a control head (a head containing system control switches or buttons) for the knob typically placed atop these sticks. While such a simple adaptation of the typical collective control stick meets the immediate goal of placing system control means in a locus which is somewhat accessible to an operator, this goal has been met without desirable ergonomic and anthropomorphic refinements. There remains a need in the art for collective sticks fitted with control heads which are designed to account for hand size; the hand, forearm and upper body orientation of a seated operator; to make control operations very easy, rapid and sure while the operator maintains his hand on the control stick during flight; and to ease or avoid added operator fatigue and distraction in making multiple system control inputs during a flight.

To meet these needs, the collective controllers of the present invention have a handgrip portion shaped to fit the human hand curled in a gripping mode, so that collective pitch control inputs may be made smoothly and precisely over extended mission periods (1–2 hours); provide a bend in the collective stick shaft at the handgrip to conform to the general orientation of the hand while an operator is seated (thus permitting superior sitting posture for the operator); provide a collective head with system control switches placed on the collective head face to enable the operator to work the switches easily and swiftly with the thumb while maintaining his normal grip on the collective control stick during flight operations. These improvements to helicopter collective control sticks are especially advantageous in combat, but are nonetheless applicable to aircraft performing other combat-related or noncombat missions including reconnaissance, supply, utility, transport, heavy lift, and convoy missions. While the invention is intended mainly for helicopters, other derivative controllers of the invention with modified control heads would be applicable to tilt-rotor aircraft, hovercraft, flarecraft, spacecraft, wingships, and submersible craft, also.

SUMMARY OF THE INVENTION

A collective control stick head with extension primarily for rotorcraft is provided in this invention. The head portion of the collective controller contains system control switches in a site readily accessible to an operator, permitting the operator to work the switches with the thumb while maintaining a grip on the collective controller. The extension is conformed so that an operator may grip the collective controller and work system control switches, even for sustained periods of flight operations, and experience less fatigue, discomfort and distraction than with ordinary collective controllers with system control heads of the prior and related art.

The head may contain control switches for a variety of different systems, including those having utility, reconnaissance, transport, heavy lift, and weapons and combat functions. The extension portion of the control head comprises a tube member and a hand grip member. Electrical wiring runs from the control switches in the head through the hollow inside of the hand grip and the tube, through a root end tube, and having outlets where suitable. The hand grip is offset laterally and longitudinally from the tube. The lateral offset is in the range of 10° to 20° from the axis of the tube; the longitudinal offset is in the range of 8° to 12° from the axis of the tube. The head is canted back (aftward longitudinally) toward an operator, to make the system control switches more accessible to the operator. The tube is coaxial and concentric with a root end tube member which is connected to collective pitch control means which may be servo-mechanical, fiber optic, electronic, or otherwise.

The hand grip is conformed to the shape of the human hand, having contours for the hand and thumb. Indentations for the fingers may be added optionally. The grip will be made of or coated with a phenolic material which inhibits sliding of the hand, and provides superior grip feel and comfort. Optionally ridges or grooves in any suitable pattern may be formed on the grip material further to inhibit sliding or similar unwanted movement of the hand.

DESCRIPTION OF THE PREFERRED EMBODIMENT

Figure 1:
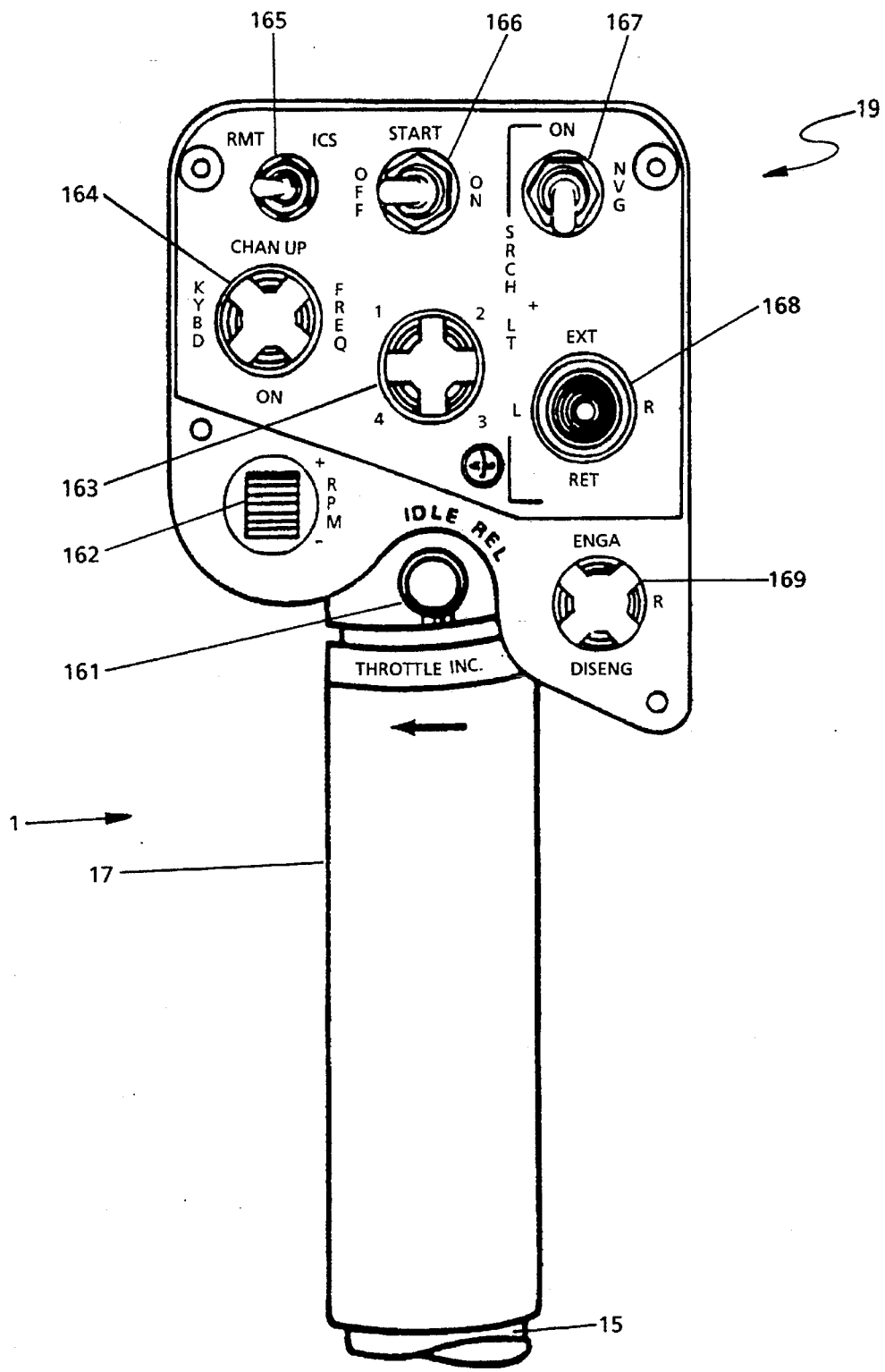
FIG. 1 depicts a prior art helicopter collective controller with head having system control switches and a portion of the stick shaft upon which the head is mounted.

A helicopter pilot's prior art collective control stick I with system control switches lodged in head member 19 is shown in FIG. 1. This particular collective control stick and head are used in the U.S. Army's OH-58D Kiowa armed reconnaissance helicopter. In terms of general design and configuration this collective control stick is generally typical of those installed and used in current helicopters of all kinds, civilian and military, large and small, throughout the world. The basic structural components of the stick are the root end 15 of the stick which moves slidably within a hollow tube (not shown) mounted fixedly in the cockpit, a handgrip portion 17 which is mounted atop the root end 15, and a head member 19 which contains system control switches. In this case the hand grip portion 17 incorporates the throttle. The root end 15 of the collective control stick is connected to servo-mechanical means (not shown) which adjust the collective pitch of the main rotor blades according to the operator's vertical (up and down) movements of the collective control stick.

The system control switches on the head 19 of the particular prior art collective stick 1 shown in FIG. 1 are as follows: idle release switch 161; RPM trim switch 162; radio select switch 163; channel select switch 164; communication RMT ICS switch 165; start switch 166; searchlight power switch 167; searchlight control switch 168; and SCAS heading hold engage/disengage trim switch 169.

The basic design of collective control sticks can be characterized as two concentric (coaxial) tubes, one generally fixed to the cockpit floor or to some structural element of the craft, and the second slidably mounted within the first tube. A head (or knob) of some sort is usually mounted atop the second tube (the inner one) to prevent the operator's hand from sliding off during a maneuver; it may be adapted to house system control switches.

It is helpful to see a schematic illustration of a cockpit layout more fully to understand the complex array of instruments, switches and controls that a pilot or crewmember must monitor and use during flight. FIG. 4 shows a cockpit layout with the relative placement of the collective controller 2 with head member 3 of the invention (this is the same head 3 depicted in FIGS. 2 and 3), the cyclic control stick 101, the instrument panel 105, and the pilot's crewseat 100. The cockpit shown in FIG. 4 is the pilot's station in a rotorcraft air-to-air combat (RATAC) cockpit. The instrument panel and side bar feature the following system controls: rocket control panel 102; data/message entry keyboard 103; power lever quadrant 104; clock 106; miscellaneous equipment activation switches 107; armament panel 108; miscellaneous rheostat switches 109; exhaust gas temperature gauge 110; engine gas generator indicator 111; engine torque indicator 112; engine (Np), rotor (Nr) indicator 113; boresight reticle 114; systems display touchscreen panel 115; stores jettison control panel 116; maneuver envelope warning lights 117; master caution warning light 118; cautionary/warning panel 119; programmable switches 120; tactical situation display 121; G-meter 122; turn and slip indicator 123; airspeed indicator 124; radar altimeter 125; vertical speed indicator 126; barometric altimeter 127; and standby compass 128. The cockpit shown in FIG. 4 is for a rotorcraft having air-to-air fighter capability. This is a fairly advanced mission concept, but the layout, controls and instrumentation are representative of future rotorcraft having a variety of different missions, and helpfully convey the scope of interaction between crew and instruments and controls in a variety of airborne situations.

Figure 2:
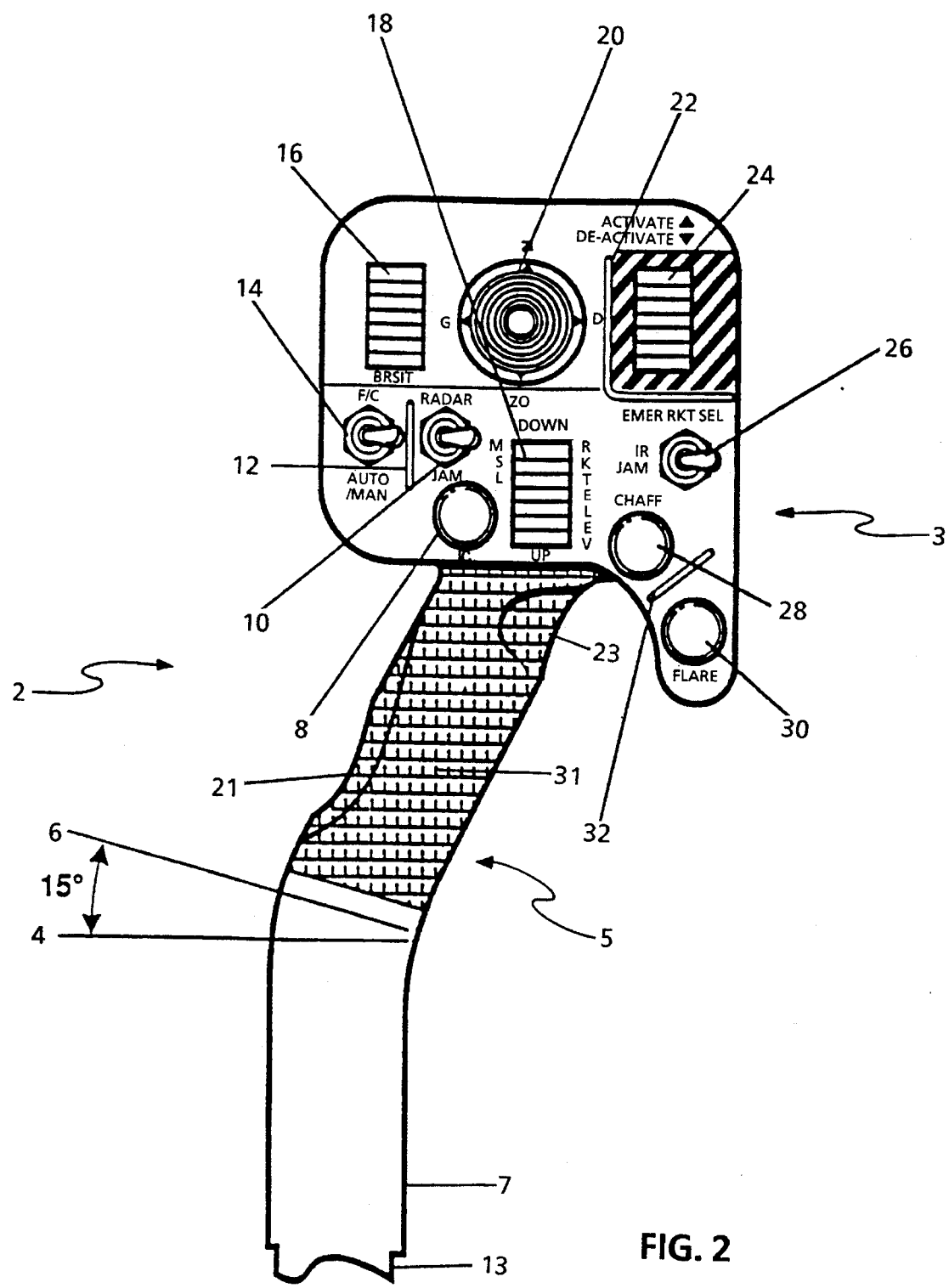
FIG. 2 is a frontal view of an air combat collective control head of the invention.
Figure 3:
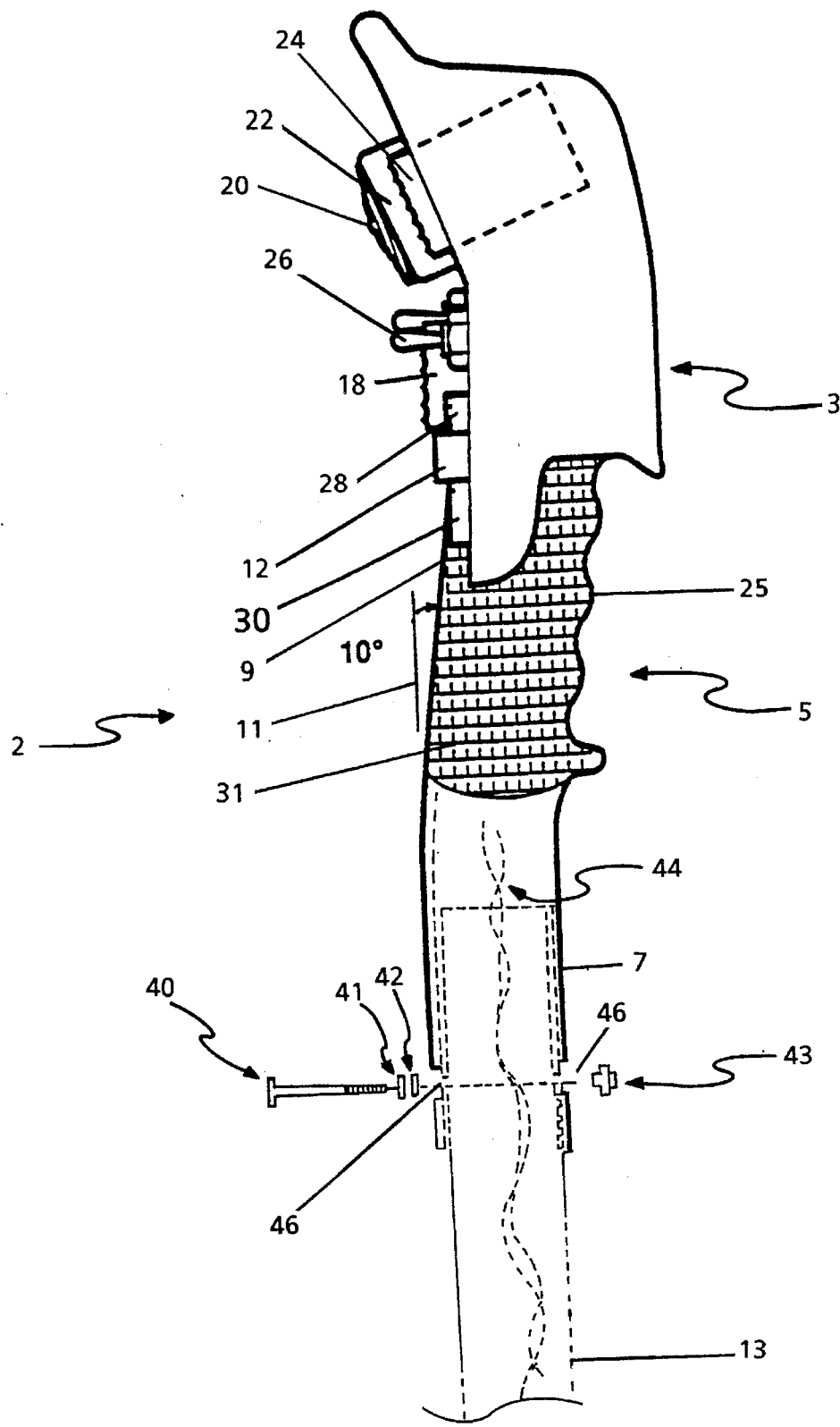
FIG. 3 is a side view of an air combat collective control head of the invention.
Figure 4:
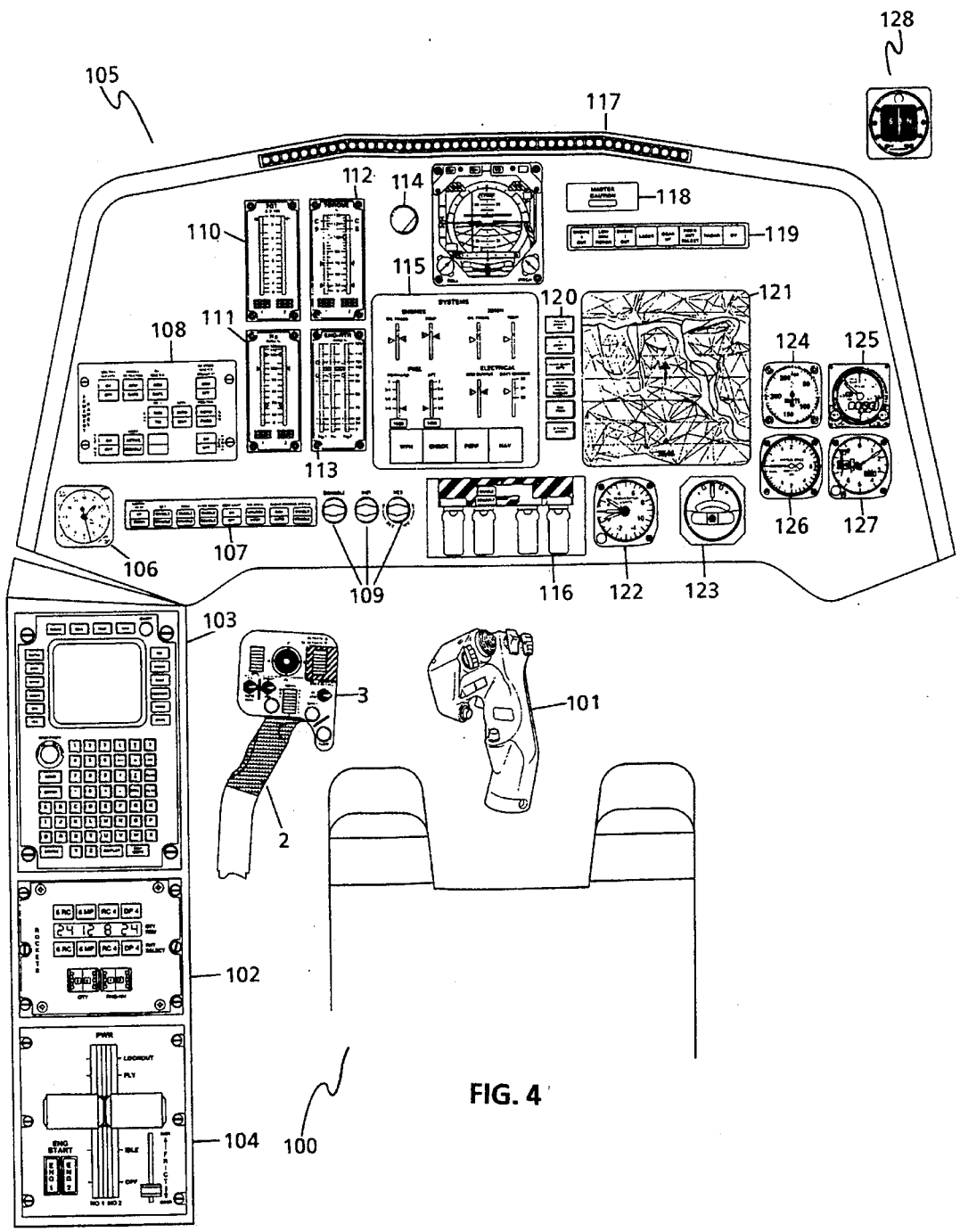
FIG. 4 shows a rotorcraft air-to-air combat (RATAC) cockpit including the placement of the collective controller relative to the crewseat and other controls and instruments.

A helicopter collective control stick 2 with system control head and extension 3 of the invention is shown in FIGS. 2 and 3. In the drawings, the control head 3 shown designates controls for combat and weapons systems. The control head 3 shown may be interchanged with other control heads containing system control switches for any of the other functions enumerated above (utility, heavy lift, etc.), and thus may be used on any kind of civilian or military helicopter craft. As used herein, "control head" or simply "head" refers to the control head and its extension which, as described in detail below, includes the head member 3, the hand grip 5, and the tube portion 7. A general allusion to the head and its reference numeral 3 may be understood to embrace the extension (grip 5 and tube 7) and the various appurtenances of the head and extension. This will be clear from the context; the general language is used for simplicity and brevity.

FIG. 2 is a frontal view and FIG. 3 is a side view, respectively, of a collective control stick 2 with control head 3 of the invention. The control head 3 shown is a generic combat control head; the head 3 is equivalent in the two views—only the perspective is different in each. It is shown for illustrative purposes. Substitutions may be made, or different function switches placed on a control head without deviating from the spirit or scope of the invention. The switches shown on the generic head will now be described in further detail in relation to the function that each button or switch represents (the reference numbers in FIG. 2 and FIG. 3 designate equivalent controls): initial condition switch 8, radar jamming 10, switch guard 12, flare/chaff (automatic or manual) 14, helmet mounted display boresight 16, missile pylon elevation (forward: pylon down; rear: pylon up) 18, map display 20 (forward: zooms in; rear: zooms out; left: grid; right: declutter), switch guard 22, emergency rocket select 24, infrared jamming activation 26, chaff firing 28, flare firing 30, and switch guard 32.

The collective control head 3 of the invention as depicted in FIGS. 2 and 3 is comprised at its lower end of a tube portion 7 which is mounted fixedly on the outside of a concentric root end tube 13 of smaller diameter by any conventional means. In FIG. 3 the means for mounting tube portion 7 fixedly on concentric tube 13 comprises a threaded machine screw 40, lock washer 41, sleeve spacer 42, and self-locking nut 43. The screw 40 passes through mating holes 46 in tubes 7 and 13. Electrical wiring 44 which connects the various system control switches in the collective head 3 to the respective systems is shown in FIG. 3 passing inside the concentric tubes 7 and 13. Tube 13 in turn is mounted slidably inside a concentric tube or orifice of slightly larger diameter (not shown) which is mounted to the floor, frame or other such structural feature of the craft. The slidable movement of tube 13 inside the tube or orifice not shown accounts for the collective control inputs by the aircraft operator; servo-mechanical, fiber optic, electronic or other collective pitch control means are activated by this slidable movement of the tube portion 13 originating with an operator gripping the handgrip 5 of the collective head 3 and moving the collective stick vertically.

The grip 5 is offset from the tube 7 both laterally and longitudinally. In FIG. 2 the degree of the offset is shown in relation to reference lines 4 and 6. Reference line 4 designates a linear set of points that is perpendicular to the vertical axis of the tube 7 while reference line 6 designates a linear set of points that is perpendicular to the axis of the grip 5. As indicated in FIG. 2, the offset in this particular embodiment is 15°. This magnitude of offset is preferred, though the magnitude may vary between 10° and 20°. In addition to this lateral offset, FIG. 3 shows that the stick in the lower grip 5 portion will be offset from the tube 7 by about 10° measured between a vertical line 11 which is colinear with the outside surface of the front of tube 7 (and parallel with the vertical axis of tube 7) and a line 9 that is colinear with the outside surface of the front of grip 5 (and substantially parallel to the axis of the grip 5). The magnitude of offset shown in FIG. 3, 10°, is the preferred magnitude; the magnitude may vary between 8° and 12°. This offset is longitudinal (in a fore-and-aft direction in relation to the operator) and has the effect of moving the grip 5 away from (i.e., fore of) the operator. FIG. 3 also shows that the upper portion of the head 3 is canted down toward the operator's hand which will be curled around the grip 5 with the thumb up, making the switches more readily accessible to the operator's thumb.

The lateral and longitudinal offsets and the canting of the upper portion of head 3 enable an operator to grip the stick during flight, even for long periods, while avoiding fatigue and distractions, and further enable the operator to work the system control switches with the thumb of the left hand while maintaining a grip on the controller at least adequate for controlling the collective pitch of the main rotor during flight.

The collective stick will normally be mounted so that the tube 13 will be substantially perpendicular to the floor or other structural member to which, or in relation to which, it is mounted; any other structural member (such as an armrest or sidebar type structure) will normally be substantially parallel to the floor. It may be necessary to adjust the degrees of lateral and longitudinal offset should the tube end 13 of the collective controller be offset in any significant magnitude from substantial perpendicularity to its subjacent supporting structure or should such structure deviate to any significant extent from a substantially parallel relationship to the longitudinal axis of the craft.

The grip 5 has contours 21 and 23 (FIG. 2) which are indentations in the surface of the grip for the hand and the thumb, respectively. Normally, an operator manipulates the collective control stick with his left hand. The back side of the grip 5 may provide finger contour indentations 25 (FIG. 3). The grip will typically be made of or coated with a plastic or phenolic material that prevents or inhibits sliding of the hand and provides grip comfort. Optionally, the grip 5 may have ridges or grooves 31 in any suitable pattern over all or a portion of its surface to minimize or eliminate sliding of the operator's hand during flight operations.

The particular embodiment of the stick shown in FIGS. 2 and 3 and described in detail above is positioned and designed for use by an operator's left hand. The lateral offset shown in FIG. 2 is set especially for the left hand; the longitudinal offset would be the same regardless if the head should be placed on a left-hand or right-hand control instrumentality. Thus it can be seen clearly that to change the lateral off-set to the left instead of to the right by the same magnitude, the mirror image head for use by the right hand may be created.

It is clear from the foregoing that some modifications or variations on the specific embodiments and examples set forth above to illustrate the improvements of this invention are possible and that some may occur to skilled practitioners of the art to which the invention pertains. Unless explicitly limited by the claims which follow, such modifications or variations are deemed to be within the spirit and therefore the letter and the scope of the instant invention.

What is claimed is:

1. A control head which imparts control signals to a propulsion means of a vehicle, said control head comprising a root end tube member connected to means for controlling the propulsion means; a concentric tube portion mounted fixedly to the root end tube member; a phenolic coated handgrip having contoured indentations conforming generally to the shape of the palm and thumb of a human hand and mounted fixedly on the concentric tube portion, said handgrip being offset laterally in the range of 10° to 20° and longitudinally in the range of 8° to 12° from said tube portion; a head member, having its upper portion canted back toward an operator and being integral with the handgrip, said head member containing auxiliary system actuation means; and means for transmitting electrical impulses from the actuation means to their respective auxiliary systems.

2. The control head described in claim 1 wherein the phenolic coated handgrip also has contoured indentations conforming generally to the shape of fingers.

3. The control head described in claim 2 wherein the handgrip is offset laterally 15° and longitudinally 10° from the tube portion.

4. The control head described in claim 3 wherein the handgrip is offset laterally from the concentric tube portion in a manner specifically positioned for use by the left hand.

5. The control head described in claim 4 wherein the concentric tube portion has slightly larger diameter than the root end tube member to which it is fixedly mounted.

6. The control head described in claim 2 wherein the handgrip is offset laterally from the concentric tube portion in a manner specifically positioned for use by the left hand.

7. The control head described in claim 6 wherein the concentric tube portion has slightly larger diameter than the root end tube member to which it is fixedly mounted.

8. In a rotary wing aircraft having at least one main rotor, a control head which imparts signals to a collective pitch control means of the at least one main rotor, said control head comprising a root end tube member connected to the means for controlling the collective pitch of the at least one main rotor; a concentric tube portion mounted fixedly to the root end tube member; a phenolic coated handgrip having contoured indentations conforming generally to the shape of the palm and thumb of a human hand and mounted fixedly on the concentric tube portion, said handgrip being offset laterally in the range of 10° to 20° and longitudinally in the range of 8° to 12° from said tube portion; a head member, having its upper portion canted back toward an operator and being integral with the handgrip, said head member containing auxiliary, system actuation means; and means for transmitting electrical impulses from the actuation means to their respective auxiliary systems.

9. The control head described in claim 8 wherein the phenolic coated handgrip also has contoured indentations conforming generally to the shape of fingers.

10. The control head described in claim 9 wherein the handgrip is offset laterally 15° and longitudinally 10° from the tube portion.

11. The control head described in claim 10 wherein the handgrip is offset laterally from the concentric tube portion in a manner specifically positioned for use by the left hand.

12. The control head described in claim 11 wherein the concentric tube portion has slightly larger diameter than the root end tube member to which it is fixedly mounted.

13. The control head described in claim 9 wherein the handgrip is offset laterally from the concentric tube portion in a manner specifically positioned for use by the left hand.

14. The control head described in claim 13 wherein the concentric tube portion has a slightly larger diameter than the root end tube member to which it is fixedly mounted.

15. The control head described in claim 9 wherein the concentric tube portion has a slightly larger diameter than the root end tube member to which it is fixedly mounted.

16. The control head described in claim 15 wherein the handgrip is offset laterally 15° and longitudinally 10° from the tube portion.

17. The control head described in claim 16 wherein the handgrip is offset laterally from the concentric tube portion in a manner specifically positioned for use by the left hand.

18. The control head described in claim 16 wherein the concentric tube portion has slightly larger diameter than the root end tube member to which it is fixedly mounted.

19. The control head described in claim 8 wherein the handgrip is offset laterally from the concentric tube portion in a manner specifically positioned for use by the left hand.

20. The control head described in claim 19 wherein the concentric tube portion has slightly larger diameter than the root end tube member to which it is fixedly mounted.

21. The control head described in claim 8 wherein the concentric tube portion has a slightly larger diameter than the root end tube member to which it is fixedly mounted.

* * * * *